May 17, 1927.  F. D. MacDONALD  1,629,112
FLORAL SUPPORT
Filed May 8, 1925
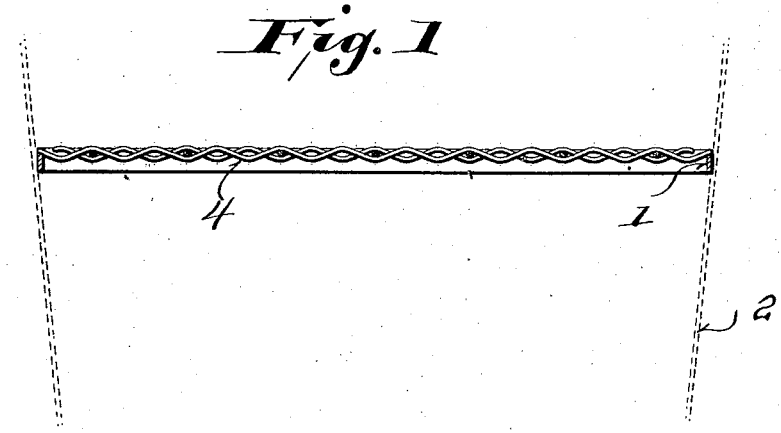
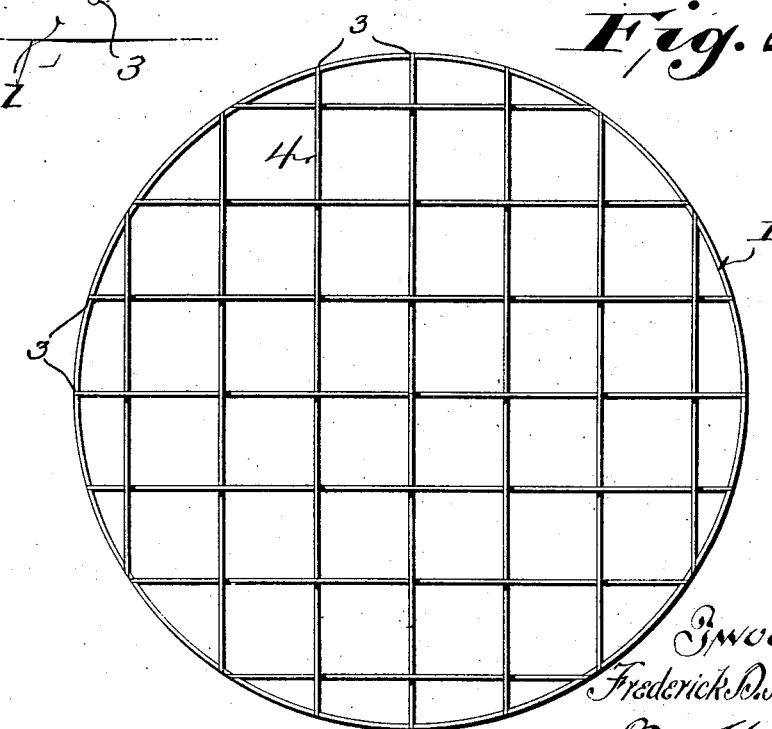

Patented May 17, 1927.

1,629,112

UNITED STATES PATENT OFFICE.

FREDERICK D. MacDONALD, OF MILWAUKEE, WISCONSIN.

FLORAL SUPPORT.

Application filed May 8, 1925. Serial No. 28,838.

This invention relates to floral supports for containers of the basket or other type.

Objects of this invention are to provide a floral support which may be slipped into the tapered container, which will engage the inner walls thereof in a very secure manner, and which will provide a plurality of open spaces for the reception of the stems of flowers.

Further objects are to provide a floral support in which the cross wires are very securely anchored in the peripheral rim in a novel and efficacious manner, and in which a very simple and cheap construction is attained.

An embodiment of the invention is shown in the accompanying drawings, in which:—

Figure 1 is a transverse sectional view through the support showing the adjacent portions of the container in dotted lines.

Figure 2 is a plan view of the support.

Figure 3 is an enlarged face view of a portion of the peripheral ring.

Referring to the drawings it will be seen that the floral support comprises a ring 1 which is contoured to fit the container 2, as shown in Figure 1. This ring is continuous and is provided with a plurality of notches 3 which receive the ends of the wires 4, as shown in Figures 2 and 3. These wires are firmly seated in the notches and are preferably crimped and arranged in an alternately crossed relation, as shown in Figures 1 and 2. Thereafter, each of the several joints is shouldered and a very secure and rigid structure is provided. Preferably, the wires are crimped, as shown in Figure 1, so as to prevent slipping of the flower stems in each of the several squares and also to materially improve the ornamental appearance of the device.

It is to be noted that the wires are crimped between each two of the crossing points so as to provide a wavy or crimped formation of each of the several stretches of wires. The wires not only pass below each other alternately, but also are individually crimped, as stated, between each two crossing points. In addition to this, it is to be noted particularly from Figures 1 and 3 that the top of the ring is flush with the top of the wires. This avoids any upward projecting portion of the wires. This construction is desirable for the reason that the upwardly projecting portions of the wires in devices of this type are frequently bent outwardly and interfere with the accurate seating of the ring within a vessel or basket.

The device is ornamented by enamel, paint or similar decoration and is preferably colored to harmonize with the foliage of the flowers. It is positioned within the container 2 and, as is well known, these containers usually have tapered walls. The device is thus wedged between the tapered walls and securely held in position, the strain being borne by the peripheral rim 1 and the joints for the wires being relieved of the strain.

It will be seen, therefore, that a very simple type of flower support has been provided which is extremely simple and strong in construction although of light weight, and is of attractive and pleasing appearance.

Although the invention has been described in considerable detail, it is to be understood that the invention may be variously embodied and is, therefore, to be limited only as claimed.

I claim:

A floral support for removable positioning within a container and comprising a metal band having a notched upper edge, a plurality of wires having their ends secured in said notches, said wires crossing each other to form a plurality of apertures for the reception of stems of flowers, the wires between each two crossing points being crimped.

In testimony that I claim the foregoing I have hereunto set my hand at Milwaukee, in the county of Milwaukee and State of Wisconsin.

FREDERICK D. MacDONALD.